United States Patent [19]

Braisted, Jr.

[11] Patent Number: 4,614,451

[45] Date of Patent: Sep. 30, 1986

[54] TURNBUCKLE CLAMP ASSEMBLY WITH ORIENTATION WASHER

[75] Inventor: Leon O. Braisted, Jr., Madison Heights, Mich.

[73] Assignee: General Motors Corporation, Detroit, Mich.

[21] Appl. No.: 794,426

[22] Filed: Nov. 4, 1985

[51] Int. Cl.[4] ............................................. F16B 7/06
[52] U.S. Cl. ...................................... 403/14; 403/43; 403/290
[58] Field of Search ................. 403/13, 14, 43, 290, 403/356

[56] References Cited

U.S. PATENT DOCUMENTS 2,723,141  11/1955  Ricks ................................. 403/290
2,736,581  2/1956  Ricks ................................. 403/43

FOREIGN PATENT DOCUMENTS 521126  1/1956  Canada ................................. 403/43

Primary Examiner—Andrew V. Kundrat
Attorney, Agent, or Firm—Arthur N. Krein

[57] ABSTRACT

A bolt type, split ring clench clamp as used to apply a clamp-up force to the slotted end of a turnbuckle has an orientation washer supported by the clench bolt between the terminal lugs of the clamp so that one end portion of the orientation washer loosely extends into the slot whereby to effect radial orientation of the clamp relative to the slot, the orientation washer also including means to abut either against the end of the turnbuckle or the blind end of the slot whereby to effect longitudinal orientation of the clamp on the turnbuckle so that a desired clamp-up force can be applied to the slotted end of the turnbuckle.

2 Claims, 5 Drawing Figures

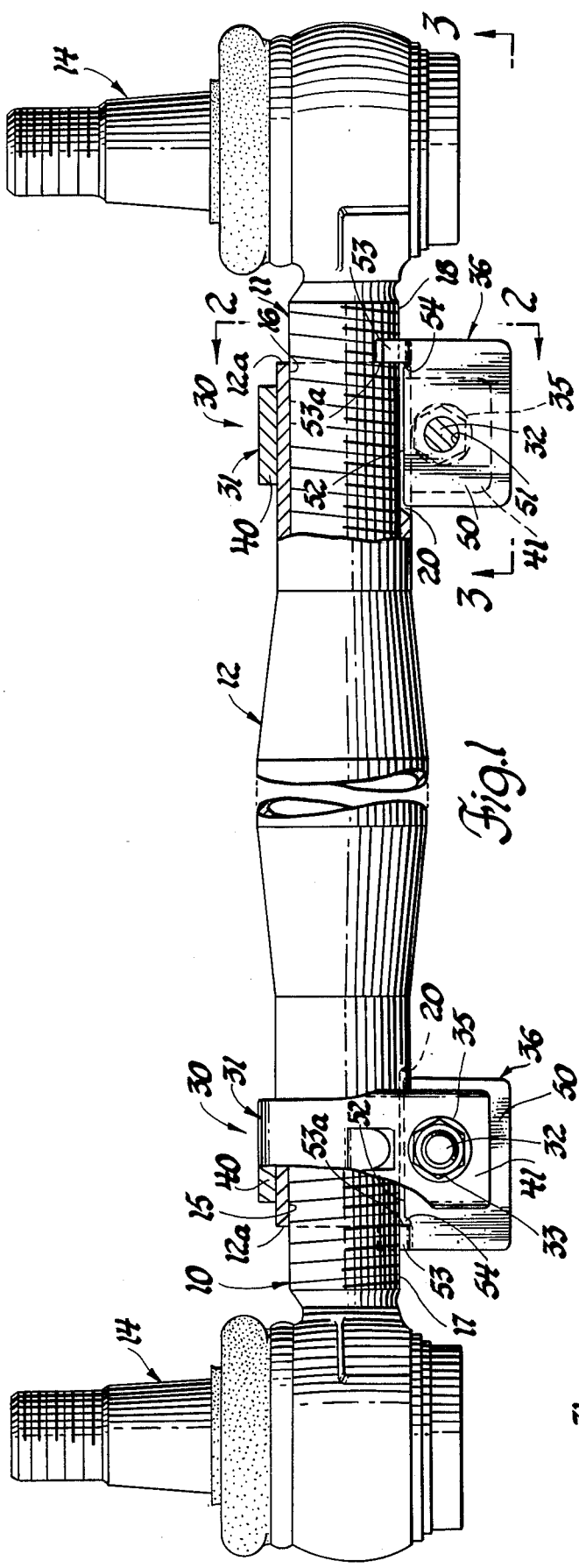
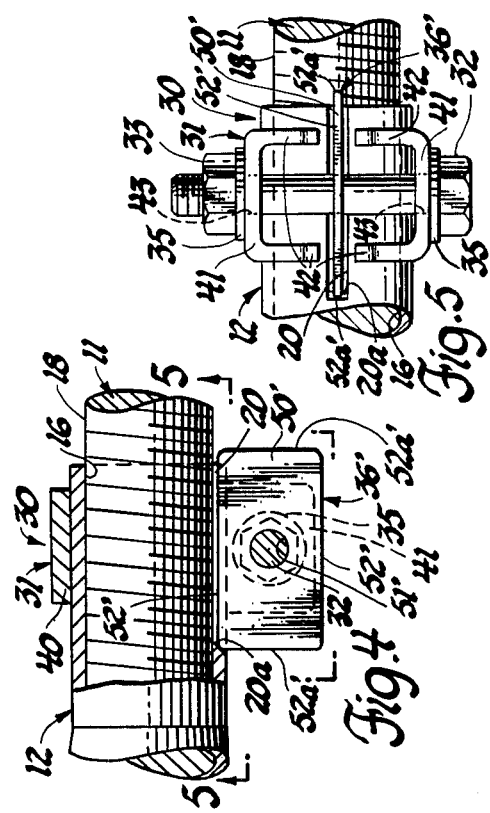
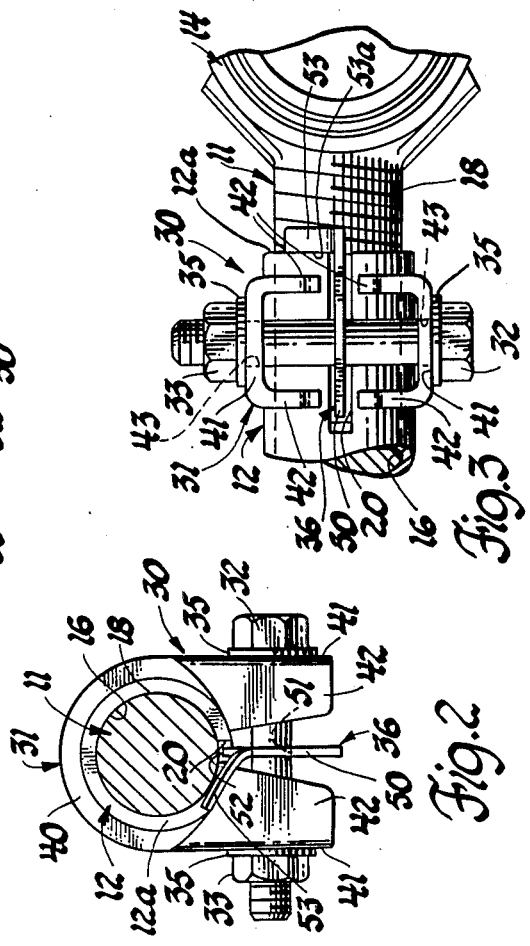

4,614,451

TURNBUCKLE CLAMP ASSEMBLY WITH ORIENTATION WASHER

FIELD OF THE INVENTION

This invention relates generally to a turnbuckle clamp assembly used, as an example, for connecting tie rods and the like in motor vehicles and, in particular, to a bolt type clench clamp assembly having an orientation washer associated therewith to effect both radial and longitudinal positioning of the clamp on a slotted end of an associate turnbuckle.

DESCRIPTION OF THE PRIOR ART

Steering linkage tie rod assemblies, as used in motor vehicles, conventionally employ so-called turnbuckle adjustment means that include opposite hand, internal threads formed in opposite ends of a sleeve like adjuster tube or turnbuckle for threaded engagement with corresponding external threads on a pair of associate tie rod elements. Adjustment of the overall effective length of such a tie rod assembly is accomplished by rotating the adjuster tube in the desired direction in the manner of a turnbuckle until the desired length is obtained, thus the adjuster tube will hereinafter be referred to as a turnbuckle. After the desired adjustment has been made, suitable locking means are then used to prevent further rotation of the turnbuckle relative to the tie rods.

In the prior art, this locking means has normally been in the form of a pair of split ring bolt type clench clamps used at opposite split ends of the turnbuckle, each such clamp having apertured terminal lugs to receive a fastener means, such as a bolt and nut, used to effect tightening of the clamp to contract the split end of the turnbuckle about the associate tie rod to prevent rotation of these elements relative to each other.

Such a split ring bolt type clench clamp in order to contract the split end of a turnbuckle about the associate tie rod must be suitably radially and longitudinally orientated relative to the slot and slotted end of the turnbuckle, respectively, so that when the nut is torqued down on the associate bolt to draw the terminal lugs of the clamp toward each other, sufficient clamping force is applied substantially perpendicular to and on the same side of the tube as the longitudinal slot on the slotted end so as to reduce the width of the slot and to thereby effect clamp-up of the slotted tube end of the turnbuckle onto the tie rod whereby to prevent rotation of these elements relative to each other.

It is also known in the art that in order to eliminate the need of an assembler or mechanic to affect such radial and longitudinal orientation of such split ring clamps on a turnbuckle, which can become rather difficult if the turnbuckle has been rotated so that the slots are not visible to the assembler or mechanic, such a turnbuckle and the associate split ring clamps, per se, can be assembled on an alignment fixture whereby each split ring clamp will be located a predetermined distance from the associate free slotted end of the turnbuckle and radially orientated such that the slot in the turnbuckle is located substantially equal distant between the terminal lugs of the clamp when the latter are in their free position, the clamp then being spot welded to the turnbuckle at a location substantially diametrically opposite the slot. This clamp orientation and welding operation is normally performed at a plant which manufactures the turnbuckle prior to shipment of the unit assembly of turnbuckle and clamps to a vehicle assembly plant. However, this spot welding operation and subsequent shipment of the turnbuckle, in unit assembly with the associate split ring clamps, is relatively expensive.

SUMMARY OF THE INVENTION

It is therefore a primary object of this invention to provide a turnbuckle clamp assembly with orientation washer for use, for example, for connecting tie rods, as in a vehicle steering linkage assembly, whereby the orientation washer is adapted to radially and longitudinally locate a split ring clamp on the slotted end of the turnbuckle so that a proper clamp up force can be obtained to lock the turnbuckle against rotation relative to a tie rod which has been adjustably threaded therein.

Another object of this invention is to provide a simple, inexpensive orientation washer for use in effecting orientation of a split ring bolt type clench clamp on the slotted end of a turnbuckle, whereby the clamp is suitably orientated so that a proper clamp up force can be applied on the turnbuckle about an associate tie rod whereby to prevent rotation of these elements relative to each other.

These and other objects of the invention are obtained by means of a slotted turnbuckle with bolt type clench clamp having an orientation washer associated therewith that is operative to effect both radial and longitudinal positioning of the clamp whereby the clamp is operative to apply a clamp force on the turnbuckle against a tie rod or the like threaded in the turnbuckle to prevent relative rotation of these elements. In a preferred embodiment, the orientation washer is of L-shape, the longitudinal long washer leg portion thereof having an aperture to allow the clamp bolt to extend therethrough such that an edge end of this leg will extend into the slot at an end of the turnbuckle a predetermined distance, the aperture being located a predetermined distance from the foot of the L-shaped washer, the foot being bent so as to abut against the associate outboard end or abutment surface of the turnbuckle to effect longitudinal positioning of the clamp on the slotted end of the turnbuckle. In an alternate embodiment, the orientation washer is of rectangular configuration with a central aperture therethrough for the same purpose as described hereinabove, the aperture being located a predetermined distance from the transverse ends of the washer so that abutment of the inboard transverse end of the washer against the blind inboard end of the slot in the turnbuckle will effect the desired longitudinal positioning of the clamp on the slotted end of the turnbuckle. The above described orientation washers are thus operative to effect both the radial and longitudinal positioning of a clamp on the slotted end of a turnbuckle.

For a better understanding of the invention, as well as other objects and further features thereof, reference is had to the following detailed description of the invention to be read in connection with the accompanying drawings.

BRIEF DESCRIPTION OF THE DRAWINGS

FIG. 1 is a side elevational view, partly broken away, of a portion of a steering linkage system of a motor vehicle, the steering linkage system having a turnbuckle and clamp assembly with orientation washer in accordance with a preferred embodiment of the invention incorporate therein at opposite ends of the turnbuckle;

FIG. 2 is a section view of the steering linkage system taken along line 2—2 of FIG. 1 to show an end view of a turnbuck-le clamp assembly with orientation washer in accordance with the preferred embodiment shown in a clamped up position;

FIG. 3 is a bottom view of a portion of the steering linkage system of FIG. 1 taken along line 3—3 of FIG. 1;

FIG. 4 is a view similar to that of FIG. 3 showing a portion of a steering linkage system with a turnbuckle and clamp assembly with an orientation washer in accordance with an alternate embodiment of the invention incorporated therein shown in a clamped up position; and, FIG. 5 is a sectional view of the assembly of FIG. 4 taken along line 5—5 of FIG. 4.

DESCRIPTION OF A PREFERRED EMBODIMENT

Referring first to FIG. 1 of the drawings, there is shown, for the purpose of illustrating an environment for the turnbuckle clamp assembly with orientation washer of the invention, a tie rod assembly for use in the steering linkage system of a motor vehicle. In the construction illustrated, the portion of the steering linkage system shown includes an inner tie rod 10 and an outer tie rod 11, each adjustably connected at one end to the other by means of a turnbuckle 12. The opposite end of each tie rod is fixed to the socket housing of a conventional ball and socket assembly 14, whereby this end of a tie rod can be secured in a conventional manner to another element, not shown, of the vehicle steering linkage system.

As is well known in the art, the interior peripheral wall of the turnbuckle 12, which is the form of a hollow, adjuster tube, is provided at opposite ends, for a predetermined axial extent, with opposite hand internal threads, that is, with right-hand threads 15 at one end and with opposite or left-hand threads 16 at the opposite end. With this arrangement, the inner tie rod 10 would, in the construction shown, be provided with complementary external right-hand threads 17 at the threaded end thereof for mating engagement with internal threads 15 and the outer tie rod 11 would be provided with external left-hand thread 18 whereby this end of the outer tie rod 11 can be threadingly engaged with the internal threads 16 of the turnbuckle. Accordingly, with this arrangement, as the turnbuckle is rotated relative to the inner and outer tie rods 10 and 11, respectively, both of these tie rods will move axially inward or outward of the turnbuckle 12 depending on the direction of rotation of the turnbuckle. It will of course be understood that in this type of steering linkage system, the inner and outer tie rods 10 and 11, respectively, as installed on a motor vehicle, would not be free to rotate with respect to each other.

The turnbuckle 12, at each free end thereof is provided with a longitudinal slot 20, of a predetermined width, that extends through the tubular wall of the turnbuckle from an associate free end thereof for a predetermined axial extent so as to permit this thus slotted end portion of the turnbuckle to be compressively clamped over an associate tie rod by a bolt type clench clamp with orientation washer, generally designated 30, whereby to prevent rotation of these elements relative to each other.

Each bolt type clench clamp with orientation washer 30 includes a split, band or ring clamp 31, a clench bolt 32 and nut 33 with washers 35, and an orientation washer 36. Each clamp 31 may, for example, be stamped from suitable heavy gauge metal, such as steel, in substantially U-shaped configuration to define a semicircular turnbuckle end receiving bight provided by a split band or ring 40 with clench or terminal ears or lugs 41 extending from the ends thereof, these lugs 41 extending in spaced apart coextensive relation substantially tangential from the bight. The terminal lugs 41 each preferably terminate in at least a pair of side flanges 42, as best seen in FIG. 3, to provide reinforcement against bending of these terminal lugs. In addition, each terminal lug 41 is provided with a bolt hole 43 of a suitable size so as to loosely receive the shank portion of the clench bolt 32.

As conventional, in the free form of the clamp 31, not shown, the terminal lugs 41 are spaced apart preferably at a diverging angle relative to each other so that upon tightening of the clamp, these terminal lugs 41 will approach a spaced apart, substantially parallel relationship to each other as best seen in FIGS. 2 and 3.

Referring now to the FIGS. 1-3 embodiment of the orientation washer 36, this washer is formed, for example, as a sheet metal stamping so as to include a rectangular washer portion 50 and a locating tab portion 53 whereby the overall configuration of the orientation washer 36 is in the shape of a block letter L with the rectangular washer portion 50 defining the long leg of the L that has a bolt receiving aperture 51 therein of a size so as to allow the shank of the clench bolt 32 to pass through it freely. The axis of the aperture 51 is located from the longitudinal inboard end surface 52, the upper surface with reference to FIGS. 1-3, of the long leg or washer portion 50 of the L, a distance equal to the distance from the centerline or axis of the bight band 40 portion of the clamp to the centerline or axis of the apertures 43 in the terminal lugs 41 minus the maximum radius of the externally threaded end of an associate tie rod 10 or 11, minus a predetermined width, for example, 0.030 inch for clearance. As thus dimensioned and as best seen in FIGS. 1 and 2, the orientation washer 36, as supported by the clench bolt 32, will have its inboard end surface 52 adapted to be loosely received in an associate longitudinal slot 20 of the turnbuckle 12 whereby to effect radial orientation of the clamp 31. However as thus dimensioned, this inboard end surface 52 of the orientation washer 36 will be in radially spaced apart relationship relative to the external threads on an associate tie rod 10 or 11, whereby when the clamp is loose, free rotation of the turnbuckle relative to the tie rods can be affected.

The locating tab portion 53 defines the foot or short leg of the L-shaped orientation washer 36 and, as best seen in FIGS. 2 and 3, it is bent out at a suitable angle relative to the rectangular washer portion 50 so as to permit threaded penetration of an associate tie rod 10 or 11, but at such an angle whereby the inboard edge thereof defining an abutment shoulder 53a of the locating tab portion 53 will abut against the associate outboard end or abutment surface 12a of the turnbuckle 12 when the rectangular washer portion 50 of the orientation washer 36 is held in place within the associate slot 20 as supported by the clench bolt 32. Preferably, in order to permit proper bending of the tab portion 53 out of the plane of the washer portion 50, there is provided a short transverse slot 54 in the washer portion 50 next adjacent to the inboard edge of the tab portion 53. The longitudinal extent of the washer portion 50 from the inboard edge of the tab portion 53 is also preselected, in this embodiment, so as to be less than the axial extent of the longitudinal slot 20.

In addition, in order to permit for the desired clamp-up of the slotted end of the turnbuckle, the thickness of the orientation washer 36 and, in particular, the washer portion 50 thereof is preselected so as to be less than the minimum width of the longitudinal slot 20 in the turnbuckle 12, as when the turnbuckle is fully clamped about the outer peripheral surface of an associate tie rod, as best seen in FIGS. 2 and 3.

During assembly of the clamp 31 with orientation washer 36 to a slotted end of the turnbuckle 12, the clamp 31 is first positioned so as to loosely encircle a portion of the slotted end of the turnbuckle 12 and then the orientation washer 36 is placed between the terminal lugs 41 and the clamp 31 is rotated as necessary so that the inboard edge 52 of the washer portion 50 of the orientation washer can be positioned so as to extend into the slot 20 of the turnbuckle 12 and with the tab portion 53 thereof located outboard of the associate free end of the turnbuckle. The bolt receiving aperture 51 of the washer portion 50 is then aligned with the bolt holes 43 in the clamp's terminal lugs 41 to permit insertion of the shank of the clench bolt 32 through the 3 in-line holes so that the nut 33 can be threaded thereon.

In regard to the above, it should be noted that, if the inboard edge 52 of the washer portion 50 is not located so as to extend into the associate slot 20 in the turnbuckle 12, the 3 holes will not be in-line which causes interference and thus the clench bolt 32 cannot be assembled to the clamp. This then is an indication to the assembler or mechanic to effect proper positioning of the orientation washer 36 as described hereinabove.

Accordingly, with both of the bolt type clench clamps and their respective orientation washers loosely attached to the turnbuckle 12, the assembler or mechanic can then effect the axle adjustment of the inner and outer tie rods 10 and 11, respectively, as desired. Thereafter, the assembler or mechanic need only move each of the clench clamp with orientation washer 30 assemblies axially inboard until the tab portion 53 of the associate orientation washer 36 abuts against the associate outboard end abutment surface of the turnbuckle, the clamp 31 then being both substantially radially and longitudinally orientated whereby the desired clamp down force can be applied to the associate end of the turnbuckle 12 around the associate tie rod, during torque down of the nut 33 on the associate clench bolt 32, so as to prevent relative rotation between the turnbuckle and tie rod.

A turnbuckle clamp assembly with an orientation washer 36', in accordance with an alternate embodiment of the invention, is shown in FIGS. 4 and 5, wherein similar parts are designated by similar numerals but with the addition of a prime (') where appropriate.

In this alternate embodiment, the orientation washer 36', which may also be formed as a sheet metal stamping from material having a thickness less than the clamped up width of the slot 20 in a turnbuckle 12, simply includes a rectangular washer portion 50' with a bolt receiving aperture 51' therethrough of a size to receive the shank of a clench bolt 32. In the particular construction shown in FIGS. 4 and 5, the axis of the aperture 51' is located from each of the longitudinal end surfaces 52' a distance equal to the distance from the centerline or axis of the bight band portion 40 of the associate clamp 31 to the centerline or axis of the apertures in the terminal lugs 41 of the clamp, minus the maximum radius of the external threaded end of an associate tie rod 11, with reference to these Figures, minus a predetermined width, as desired, for clearance. As thus dimensioned and as seen in FIGS. 4 and 5, the washer portion 50' of the orientation washer 36', as supported by the clench bolt 32, can have one of these longitudinal ends thereof adapted to be loosely received in the associate longitudinal slot 20 of the turnbuckle 12 with the longitudinal end surface 52', in effect, radially spaced outward of an associate tie rod, such as outer tie rod 11 as shown in these Figures.

In addition, in the construction shown in FIGS. 4 and 5, the axis of the aperture 51' is located from each of the transverse end surfaces 52a', a suitable predetermined distance relative to the axial extent of the slot 20 in the turnbuckle 12 whereby the inboard transverse end surface 52a' thereof will serve as an abutment shoulder so that when the clamp assembly is axially moved inboard relative to the free outboard end of the turnbuckle to a position at which the abutment shoulder abuts against the abutment surface 20a at the inboard, blind end of the slot 20, the outboard end of the split ring clamp 31 will be located longitudinally on the turnbuckle 12 a predetermined axial distance from the associate free end of the turnbuckle.

With this symmetrical length and width of both sides of the washer portion 50' relative to the axis of the aperture 51, an assembler or mechanic need not be concerned as to which longitudinal end portion of the orientation washer 36' is to be inserted into the slot 20 of the turnbuckle or as to which transverse end thereof is to be abutted against the abutment surface 20a at the inboard blind end of the slot 20. It will also be apparent that if an assembler or mechanic would attempt to insert a transverse end of the orientation washer 36' into the slot 20 of the turnbuckle 12, the aperture 51', therein would not line up with the bolt receiving holes 43 of the clamp 31 so as to receive the clench bolt 32, this thus would indicate that the orientation washer 36' has been incorrectly positioned.

While the invention has been described with reference to the structures disclosed herein, it is not confined to the specific details set forth, since it is apparent that many modifications and changes can be made by those skilled in the art. For example, the washer portion of either of the orientation washers 36 or 36' need not be of rectangular configuration or made symmetrical as with reference to the orientation washer 36'. This application is therefore intended to cover such modifications or changes as may come within the purposes of the improvements or scope of the following claims.

The embodiments of the invention in which an exclusive property or privilege is claimed are defined as follows:

1. In a coupling clamp turnbuckle assembly for use with a ball and socket assembly of the type having the socket of the ball and socket assembly providing an externally threaded tie rod extending therefrom, said assembly including a tubular turnbuckle having internal threads on at least one end thereof for threaded engagement with the external threads on the tie rod and having a slot in the one end of the turnbuckle of predetermined axial extent, an adjustable clamp assembly including a clamp and a fastening and tightening means, said clamp consisting of a split ring clamp encircling the one end of the tie rod, the split ring having a pair of clamp lugs extending from the ends thereof, the clamp lugs in the free form of the split ring clamp being in spaced apart relationship to each other, each of the clamp lugs having a bolt receiving aperture extending therethrough receiving the fastening and tightening means which includes a bolt having a head and an externally threaded shank extending therefrom on the free end of the externally threaded shank of the bolt; the improvement comprising an orientation washer of an L-shaped configuration with a washer portion of substantially rectangular configuration and having an aperture therethrough loosely receiving the shank of the bolt whereby said orientation washer is loosely positioned between the clamp lugs of the split ring clamp as supported by the bolt so that a longitudinal end of said orientation washer is loosely received in the slot of the turnbuckle, said orientation washer including a locating tab angled out of the normal plane of the said washer portion located so as to abut against the slotted said one end of said turnbuckle whereby both radially and longitudinally orientation of the clamp on the turnbuckle can be effected so that a desired clamp force can be applied to the turnbuckle onto the tie rod of the ball and socket assembly during torque down of the nut on the bolt.

2. In a turnbuckle coupling clamp assembly for use with a tie rod having external threads thereon, said assembly including a tubular turnbuckle having internal threads on at least one end thereof for threaded engagement with the tie rod, the turnbuckle at the said one end having a slot therein of a predetermined extent; an adjustable clamp assembly including a clamp with bolt and nut fastener means, the clamp including a split ring encircling a portion of said one end and having apertured clamp lugs extending from the ends thereof receiving the bolt of the bolt and nut fastener means; the improvement comprising an orientation washer of overall L-shaped configuration so as to include a thin washer portion of substantially rectangular configuration having an aperture therethrough receiving said bolt whereby said washer portion is loosely positioned between said clamp lugs and so that an end portion thereof depends loosely into said slot to effect radial orientation of said clamp lugs relative to said slot, and a locating tab angled out of the normal plane of said thin washer portion whereby said locating tab is adapted to abut against said one end of said turnbuckle for effecting a predetermined longitudinal orientation of said clamp relative to said slot on said one end of said turnbuckle.

* * * * *